(12) United States Patent
Lessmeister

(10) Patent No.: US 8,936,297 B2
(45) Date of Patent: Jan. 20, 2015

(54) SEALING DEVICE

(71) Applicant: GM Global Technology Operations LLC, Detroit, MI (US)

(72) Inventor: Roland Lessmeister, Otterberg (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/028,749

(22) Filed: Sep. 17, 2013

(65) Prior Publication Data

US 2014/0077528 A1     Mar. 20, 2014

(30) Foreign Application Priority Data

Sep. 17, 2012 (DE) .......................... 10 2012 018 410

(51) Int. Cl.
 *B62D 29/00* (2006.01)
 *B62D 25/04* (2006.01)

(52) U.S. Cl.
 CPC ..................................... *B62D 25/04* (2013.01)
 USPC .................. 296/187.02; 296/193.06; 277/641

(58) Field of Classification Search
 CPC ....................................................... B62D 25/04
 USPC ........ 296/187.1, 187.02, 193.03, 193.06, 208
 See application file for complete search history.

(56) References Cited

U.S. PATENT DOCUMENTS

| | | | | |
|---|---|---|---|---|
| 5,642,914 | A * | 7/1997 | Takabatake | ............... 296/187.02 |
| 6,186,581 | B1 * | 2/2001 | Onoue | ..................... 296/187.01 |
| 6,447,052 | B2 | 9/2002 | Saeki | |
| 6,649,243 | B2 * | 11/2003 | Roberts et al. | ................... 428/99 |
| 6,880,657 | B2 * | 4/2005 | Schneider et al. | ............ 180/68.5 |
| 6,920,693 | B2 * | 7/2005 | Hankins et al. | .............. 29/897.2 |
| 7,407,220 | B2 | 8/2008 | Kanagawa et al. | |
| 8,079,146 | B2 * | 12/2011 | Gray et al. | ................... 29/897.2 |
| 8,123,285 | B2 * | 2/2012 | Lee et al. | ................. 296/193.06 |
| 2004/0239148 | A1 * | 12/2004 | Ratet | ........................ 296/187.02 |
| 2007/0252410 | A1 * | 11/2007 | Gambatese et al. | ..... 296/187.01 |

FOREIGN PATENT DOCUMENTS

| | | |
|---|---|---|
| DE | 102009032140 A1 | 1/2011 |
| DE | 102009041315 A1 | 3/2011 |

OTHER PUBLICATIONS

German Patent Office, German Patent Search Report for Application No. 102012018410.7, dated Jun. 5, 2013.

* cited by examiner

*Primary Examiner* — Pinel Romain

(74) *Attorney, Agent, or Firm* — Ingrassia Fisher & Lorenz, P.C.

(57) ABSTRACT

A sealing device, such as a sealing bulkhead for a motor vehicle, is provided that can be arranged or is arranged between an inner column part of a motor vehicle and an outer column part of the motor vehicle and includes, but is not limited to a holder fixed on the inner column part, a separating body fixed on the a holder and at least sectionally closes a gap formed between the inner column part and the outer column part, as well as a supporting unit fixed on the separating body and on the outer column part in order to fix the outer column part on the inner column part.

12 Claims, 4 Drawing Sheets

SEALING DEVICE

CROSS-REFERENCE TO RELATED APPLICATION

This application claims priority to German Patent Application No. 10 2012 018 410.7, filed Sep. 17, 2012, which is incorporated herein by reference in its entirety.

TECHNICAL FIELD

The technical field relates to a sealing device, such as a sealing bulkhead for a motor vehicle, a column for a motor vehicle with such a sealing device, and a motor vehicle with such a column and/or such a sealing device.

BACKGROUND

Motor vehicles with columns, e.g., with A-columns and B-columns, are generally known. In the direction toward the column base, these columns comprise a sealing device that is arranged between an inner column part and an outer column part. Additional holders are provided in the region of the column base in order to fix the outer column part on the inner column part. These holders are connected, e.g., to a wheel well brace. The outer column part is connected to the holder by welding the outer column part to the holder. In this respect, it proved disadvantageous that the production of a welded joint between the holders and the outer column part is complicated due to the fact that it is difficult to access the coupling point between the holder and the outer column part.

It is at least one objective to simplify the connection of the outer column part to the inner column part. In addition, other objects, desirable features, and characteristics will become apparent from the subsequent summary and detailed description, and the appended claims, taken in conjunction with the accompanying drawings and this background.

SUMMARY

A sealing device, such as a sealing bulkhead for a motor vehicle, is provided that can be arranged or is arranged between an inner column part of a motor vehicle and an outer column part of the motor vehicle and features at least one holder that can be fixed or is fixed on the inner column part, at least one separating body that can be fixed or is fixed on the at least one holder and at least sectionally closes a gap formed between the inner column part and the outer column part, as well as at least one supporting unit that can be fixed or is fixed on the separating body and on the outer column part in order to fix the outer column part on the inner column part.

The sealing device additionally acts as a connector and/or reinforcing device due to the fact that a supporting unit is provided on the sealing device. In this way, it is possible to eliminate, e.g., an additional holder that is mounted, e.g., on the wheel well brace such that the connection can be produced with fewer components.

It is advantageous if the supporting unit comprises a supporting body and a receptacle for a clamp of the supporting unit that is realized on the supporting body. The clamp may basically be realized arbitrarily. However, it is advantageous if the receptacle on the supporting body comprises a groove-like cutout in the supporting body and/or if the clamp comprises an insert that expands when it is subjected to a temperature between approximately 100° C. and approximately 200° C., preferably between approximately 120° C. and approximately 180° C., especially between approximately 150° C. and approximately 170° C., particularly at approximately 160° C., for a time period of at least approximately 5 minutes, especially at least approximately 10 minutes, particularly at least approximately 15 minutes.

Due to the fact that a clamp is additionally provided in the supporting body, the absorption of forces by the supporting body is improved and high forces can be absorbed by the supporting unit. In this way, a stable connection of the outer column part on the inner column part is achieved such that other fastener or holders are no longer required.

In order to reduce the weight of the sealing device, particularly of the supporting unit, it is advantageous if the supporting body comprises a plastic part and/or if the clamp forms a sealing element for the sealing device and comprises, in particular, a foam part. In addition, the sealing effect of the sealing device is improved with simple means in this way.

It is furthermore advantageous if the separating body comprises at least one recess that extends, in particular, transverse or oblique to the cutout and/or if the supporting unit comprises at least one first supporting section, with which the supporting unit at least sectionally abuts on the separating body in a planar fashion by means of the supporting body, and at least one second supporting section that extends transverse or oblique to the first supporting section and can be arranged or is arranged such that it protrudes through the recess of the separating body.

The sealing effect of the sealing device is increased due to the fact that the supporting body abuts on the separating body with the first supporting section. In addition, the two parts are fixed on one another in a stable fashion due to the protrusion of the separating body through the second section of the supporting body. In order to additionally increase the stability of the sealing device and to thusly achieve a stable connection of the outer column part on the inner column part, it is advantageous according to an enhancement of the latter inventive idea if the supporting unit comprises at least one third supporting section that can be arranged or is arranged such that it extends from the first supporting section to the second supporting section while protruding through an additional recess of the at least one recess of the separating body. In this case, the first supporting section, the second supporting section and the third supporting section jointly form a triangle of forces.

In order to additionally increase the stability of the connection between the outer column part and the inner column part, it is advantageous according to an additional development if the supporting unit comprises a fourth supporting section that can be fixed or is fixed on the first supporting section and extends parallel or oblique to the second supporting section and/or if the supporting unit comprises a fourth supporting section that can be fixed or is fixed on the second supporting section and extends parallel or oblique to the first supporting section. In this case, the fourth supporting section acts in a rib-like fashion. If the fourth supporting section is fixed on the first supporting section and extends parallel to the second supporting section, the supporting unit has a π-shaped or Z-shaped appearance. If the fourth supporting section is realized on the second supporting section and extends parallel or oblique to the first supporting section, the supporting unit has an A-shaped or H-shaped appearance.

The holder may basically be connected to the inner column part arbitrarily. This also applies to the supporting unit that may be arbitrarily connected to the outer column part. However, it is advantageous if the holder can be fixed or is fixed on the inner column part separably, particularly screwed thereon, or inseparably, particularly bonded or welded thereon, and/or if the supporting unit can be fixed or is fixed on the outer column part separably, particularly screwed or clipped thereon, or inseparably, particularly bonded or welded thereon.

In order to simplify the process of fixing the outer column part on the sealing device, it is advantageous if the supporting unit comprises a fastening element, especially on the second section of the supporting body, particularly on the end of the second section that faces away from the first section, wherein a fixing element of the outer column part can be fixed, in particular, separably on or in said fastening element, particularly clipped therein. In this case, the outer column part can initially be clipped on the sealing device, particularly on the second section of the supporting unit, such that the fixing or inserting process is simplified.

The holder and the separating body may comprise components that can be separated from one another. However, it is cost-efficient and advantageous with respect to the assembly if the at least one holder and the at least one separating body comprise a common component, particularly an injection-molded part and/or bent sheet metal part. In order to improve the connection of the separating body and the supporting unit to the inner column part, it is advantageous if the sealing device comprises at least two holders that are respectively arranged on one end of the separating body and essentially extend parallel, oblique or transverse to the principal direction of the separating body.

The aforementioned objective is also attained with a column for a motor vehicle with an inner column part and an outer column part, wherein a sealing device with the above-described characteristics is arranged between the inner column part and the outer column part. The aforementioned objective is furthermore attained with a motor vehicle with a sealing device with at least one of the above-described characteristics and/or with a column with at least one of the above-described characteristics.

The sealing device, the inventive column and the inventive motor vehicle are advantageous in several respects. Since the outer column part can be fixed on the inner column part by means of the sealing device, it is possible to utilize components that are provided on the motor vehicle anyhow. In this way, the assembly and the structure of the motor vehicle are simplified. In addition, an assembly step can be eliminated because it is no longer necessary to install and fix an additional holder, e.g., on the wheel well brace such that the assembly is accelerated and simplified.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
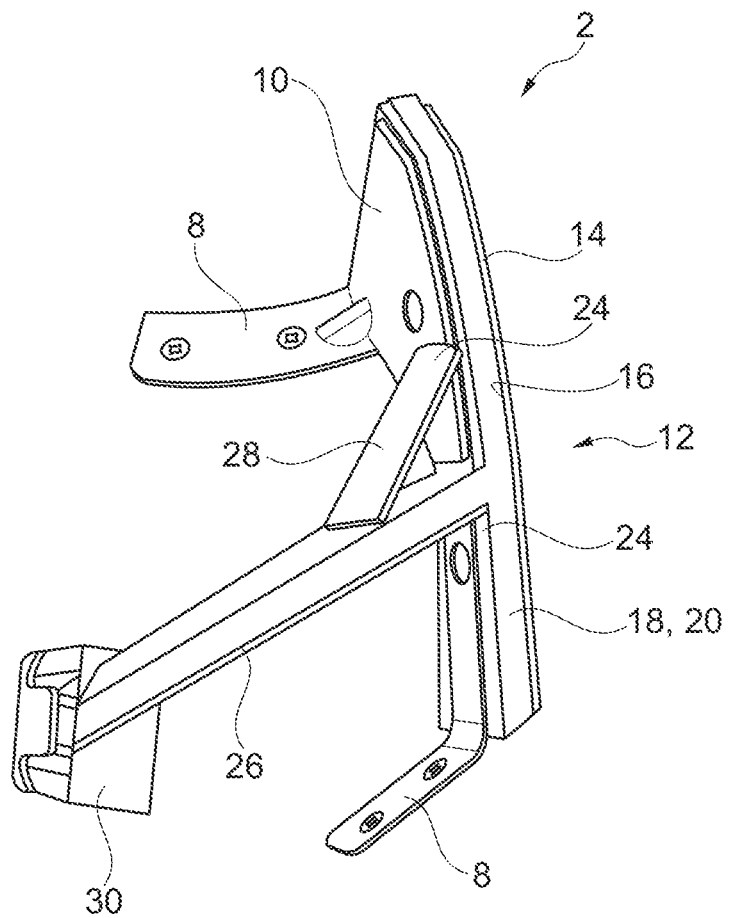
FIG. 1 shows a first exemplary embodiment of the sealing device.

The following detailed description is merely exemplary in nature and is not intended application and uses. Furthermore, there is no intention to be bound by any theory presented in the preceding background or summary or the following detailed description.

The figures show a sealing device such as a sealing bulkhead for a motor vehicle that is altogether identified by the reference symbol 2. According to FIG. FIG. 3, FIG. 4 and FIG. 5, the sealing device 2 can be arranged between an inner column part 4 and an outer column part 6 of the motor vehicle. In the embodiments illustrated in the figures, the sealing device 2 comprises two holders 8 that are respectively fixed on the inner column part 4. A separating body 10 is fixed on the two holders 8. The separating body 10 at least sectionally closes a gap formed between the inner column part 4 and the outer column part 6. In this way, the sealing device 2 acts like a sealing bulkhead for a motor vehicle. A supporting unit 12 is arranged on the separating body 10 and fixed on the separating body 10, as well as on the outer column part 6. In this way, the outer column part 6 is fixed on the inner column part 4 by means of the sealing device 2.

Figure 2:
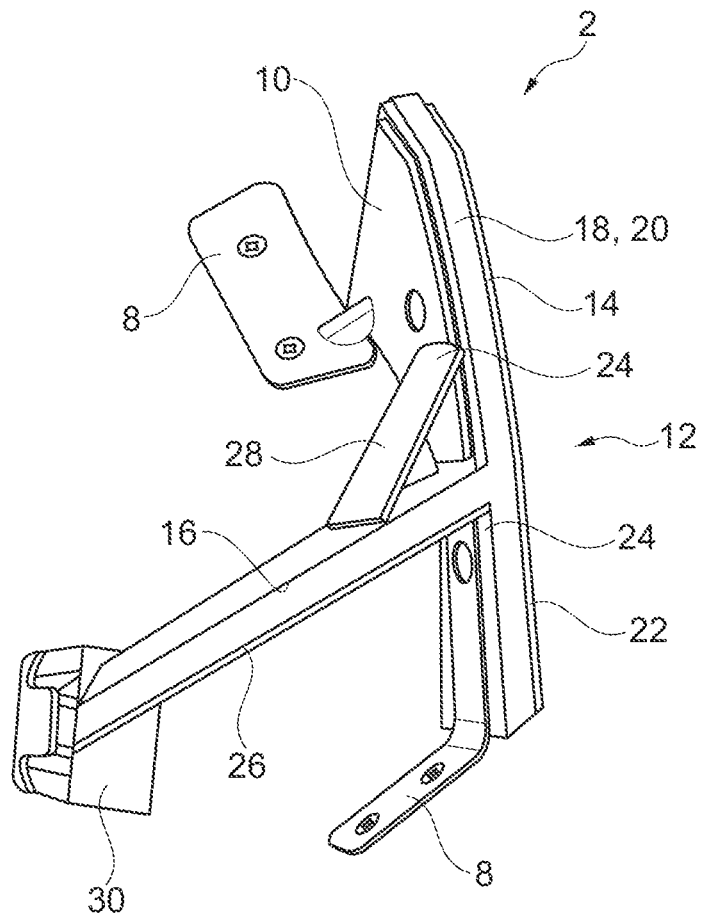
FIG. 2 shows a second exemplary embodiment of the sealing device.

FIG. 1 and FIG. 2, in particular, show that the supporting unit 12 comprises a supporting body 14 and a receptacle 16 realized on the supporting body 14. The receptacle 16 has a T-shaped appearance in the exemplary embodiment shown. A clamp 18 of the supporting unit 12 can be arranged in the receptacle 16. In the exemplary embodiment illustrated in the figures, the supporting body 14 of the supporting unit 12 comprises a plastic part, in which the receptacle 16 is realized in a groove-like fashion as a result of the molding process.

The clamp 18 preferably comprises an expandable insert that is expanded by means of heating and thusly increases the stability of the supporting unit 12. In addition, the clamp 18 acts as a sealing element 20 for the sealing device 2. In the exemplary embodiments illustrated in the figures, the supporting unit 12, particularly the supporting body 14, comprises a first supporting section 22, with which the supporting body 14 abuts on the separating body 10. The separating body 10 comprises recesses 24, through which the supporting body 14 protrudes with a second supporting section 26 and a third supporting section 28. The second supporting section 26 and the third supporting section 28 converge. The first supporting section 22, the second supporting section 26 and the third supporting section 28 jointly form a supporting framework such that the absorption of forces of the sealing device 2 is improved. In order to simplify the process of fixing the outer column part 6 on the supporting unit 12, the supporting unit 12 comprises a fastening element 30 on its end that faces away from the first supporting section 22. The outer column part 6 can be fixed on said fastening element, particularly clipped therein, with a corresponding fixing element 32.

Figure 3:
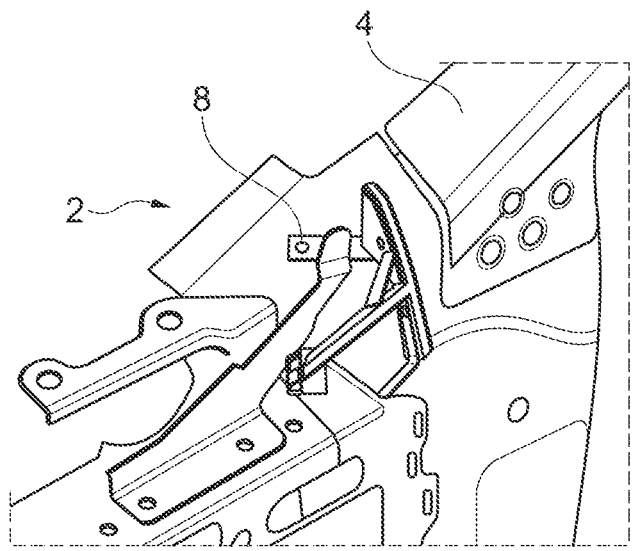
FIG. 3 shows the inventive sealing device according to FIG. 1 on an inner column part.
Figure 4:
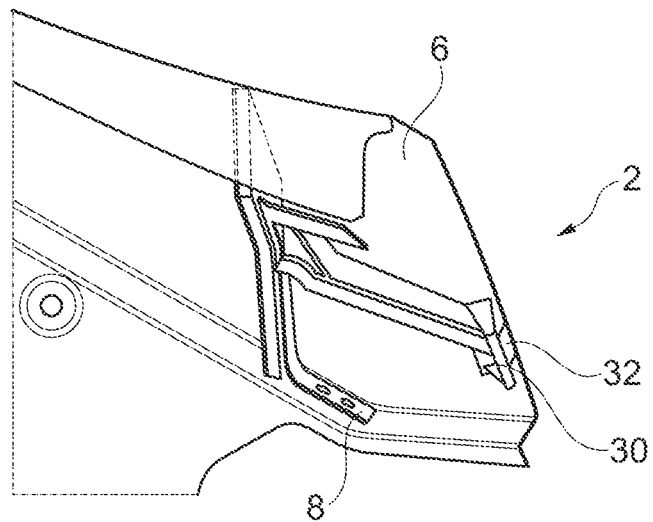
FIG. 4 shows the inventive sealing device according to FIG. 1 on an outer column part.

FIG. 1 shows a first exemplary embodiment of the inventive sealing device 2, in which both holders 8 essentially extend parallel to the second supporting section 26 of the supporting body 14. FIG. 2 shows a second exemplary embodiment of the sealing device 2, in which one holder 8 extend oblique to the second supporting section 26 of the supporting body 14. FIG. 3 shows the sealing device 2 in an installation position, in which the two holders 8 are fixed on an inner column part 4 of the motor vehicle. FIG. 4 shows the exemplary embodiment according to FIG. 1 in the installation position on an outer column part 6. In this case, the second supporting section 26 is connected to the outer column part 6 by the fastening element 30 with the aid of the fixing element 32 of the outer column part 6.

Figure 5:
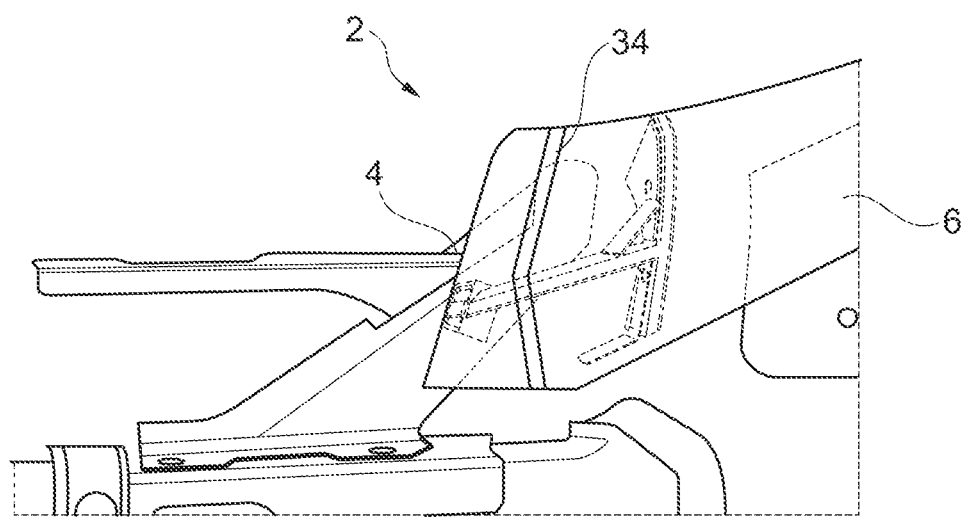
FIG. 5 shows a third exemplary embodiment of the sealing device.

FIG. 5 shows a third exemplary embodiment of the sealing device 2, in which a fourth supporting section 34 is provided. In the exemplary embodiment illustrated in FIG. 5, this fourth supporting section essentially extends parallel to the first supporting section 22 of the supporting body 14 and is arranged on the second supporting section 26. This arrangement improves the stability of the sealing device 2, particularly the stable connection of the outer column part 6 on the inner column part 4.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A sealing device for a motor vehicle arrangable between an inner column part and an outer column part, comprising:
    a holder fixed on the inner column part, wherein the holder is separably fixable on the inner column part;
    a separating body fixable on the holder and at least sectionally closes a gap formed between the inner column part and the outer column part, wherein the separating body comprises a recess that extends with respect to the groove-like cutout; and
    a supporting unit fixable on the separating body and on the outer column part in order to fix the outer column part on the inner column part, wherein the supporting unit comprises:
        a supporting body, and
        a receptacle for a clamp of the supporting unit on the supporting body, wherein the receptacle on the supporting body comprises a groove-like cutout in the supporting body, and wherein the clamp comprises an insert that expands when subjected to a temperature between approximately 100° C. and approximately 200° C. for a time period of at least approximately 5 minutes,
    wherein the supporting unit further comprises a first supporting section with which the supporting unit at least sectionally abuts on the separating body in a planar fashion with the supporting body, and the supporting unit further comprises a second supporting section that extends with respect to the first supporting section and that is arrangeble to protrude through the recess of the separating body, and
    wherein the supporting unit is separably fixable on the outer column part.

2. The sealing device according to claim 1,
    wherein the supporting body comprises a plastic part, and
    wherein the clamping forms a sealing element for the sealing device and comprises a foam part.

3. The sealing device according to claim 1, wherein the supporting unit comprises a third supporting section that is arrangeable to extend from the first supporting section to the second supporting section while protruding through an additional recess of the recess of the separating body.

4. The sealing device according to claim 1,
    wherein the supporting unit comprises a fourth supporting section that fixable on the first supporting section and extendible with respect to the second supporting section, and
    wherein the supporting unit comprises the fourth supporting section that is fixable on the second supporting section and extends with respect to the first supporting section.

5. The sealing device according to claim 1,
    wherein the supporting unit comprises a fastening element on an end of the second supporting section that faces away from the first supporting section,
    wherein a fixing element of the outer column part is separable fixable.

6. The sealing device according to claim 1, wherein the holder and the separating body comprise a common component.

7. The sealing device according to claim 1, wherein the sealing device comprises a second holder that is arranged on an end of the separating body and essentially extends with respect to a principal direction of the separating body.

8. A column for a motor vehicle, comprising:
    an inner column part;
    an outer column part; and
    a sealing device arranged between the inner column part and the outer column part, the sealing device comprising:
        a holder fixed on the inner column part, wherein the holder is separably fixable on the inner column part;
        a separating body fixable on the holder and at least sectionally closes a gap formed between the inner column part and the outer column part; and
        a supporting unit fixable on the separating body and on the outer column part in order to fix the outer column part on the inner column part, wherein the supporting unit comprises:
            a supporting body, wherein the separating body comprises a recess that extends with respect to the groove-like cutout; and
            a receptacle for a clamp of the supporting unit on the supporting body,
            wherein the receptacle on the supporting body comprises a groove-like cutout in the supporting body, and
        wherein the supporting unit further comprises a first supporting section with which the supporting unit at least sectionally abuts on the separating body in a planar fashion with the supporting body, and wherein the supporting unit further comprises a second supporting section that extends with respect to the first supporting section and that is arrangeble to protrude through the recess of the separating body, and
        wherein the supporting unit is separably fixable on the outer column part.

9. The column according to claim 8,
    wherein the supporting body comprises a plastic part, and
    wherein the clamping forms a sealing element for the sealing device and comprises a foam part.

10. The column according to claim 8, wherein the supporting unit comprises a third supporting section that is arrangeable to extend from the first supporting section to the second supporting section while protruding through an additional recess of the recess of the separating body.

11. The column according to claim 8,
    wherein the supporting unit comprises a fourth supporting section that fixable on the first supporting section and extendible with respect to the second supporting section, and
    wherein the supporting unit comprises the fourth supporting section that is fixable on the second supporting section and extends with respect to the first supporting section.

12. The column according to claim 8,
wherein the supporting unit comprises a fastening element on an end of the second supporting section that faces away from the first supporting section,
wherein a fixing element of the outer column part is separable fixable.

\* \* \* \* \*